US011923702B2

(12) United States Patent
Radchenko et al.

(10) Patent No.: US 11,923,702 B2
(45) Date of Patent: Mar. 5, 2024

(54) MAGNETO-INDUCTIVE CHARGING AND COMMUNICATION IN ELECTRONIC DEVICES

(71) Applicant: Apple Inc., Cupertino, CA (US)

(72) Inventors: Andro Radchenko, San Jose, CA (US);
Federico P. Centola, San Jose, CA (US); Vaneet Pathak, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/947,970

(22) Filed: Sep. 19, 2022

(65) Prior Publication Data

US 2023/0017571 A1    Jan. 19, 2023

Related U.S. Application Data

(60) Continuation of application No. 17/030,877, filed on Sep. 24, 2020, now Pat. No. 11,824,377, which is a
(Continued)

(51) Int. Cl.
*H02J 7/00* (2006.01)
*H02J 50/10* (2016.01)
(Continued)

(52) U.S. Cl.
CPC .......... *H02J 7/00034* (2020.01); *H02J 50/10* (2016.02); *H02J 50/80* (2016.02); *H04B 5/26* (2024.01);
(Continued)

(58) Field of Classification Search
CPC ........................................................ H02J 50/80
See application file for complete search history.

(56) References Cited

U.S. PATENT DOCUMENTS 8,577,288 B2   11/2013   Rhodes et al.
8,633,616 B2    1/2014   Soar
(Continued)

OTHER PUBLICATIONS

International Search Report and Written Opinion for PCT Application No. PCT/US2017/042907 dated Oct. 2, 2017; 14 pgs.

*Primary Examiner* — Robert Grant
(74) *Attorney, Agent, or Firm* — FLETCHER YODER PC

(57) ABSTRACT

Methods and devices useful in performing magneto-inductive charging and communication in the absence of a cellular and/or internet network connection are provided. By way of example, an electronic device includes inductive charging and communication circuitry configured to receive a signal configured to induce a charging function based at least in part on an inductive coil coupled to the inductive charging and communication circuitry. Inducing the charging function includes charging an energy storage component of the electronic device. The inductive charging and communication circuitry is also configured receive an indication to switch from the charging function to a communication function. The communication function is based at least in part on the inductive coil. The inductive charging and communication circuitry is further configured establish a communication link between the electronic device using the inductive coil to transmit and receive communication signals.

20 Claims, 10 Drawing Sheets

Related U.S. Application Data division of application No. 15/454,847, filed on Mar. 9, 2017, now Pat. No. 10,965,142.

(60) Provisional application No. 62/399,231, filed on Sep. 23, 2016.

(51) Int. Cl.
*H02J 50/80* (2016.01)
*H04L 67/104* (2022.01)
*H04W 4/14* (2009.01)
*H04W 76/10* (2018.01)
*H04W 84/12* (2009.01)

(52) U.S. Cl.
CPC .............. *H04B 5/79* (2024.01); *H04L 67/104* (2013.01); *H04W 4/14* (2013.01); *H04W 76/10* (2018.02); *H04W 84/12* (2013.01)

(56) References Cited

U.S. PATENT DOCUMENTS

| | | |
|---|---|---|
| 9,024,576 B2 | 5/2015 | Maenpaa |
| 9,293,927 B2 | 3/2016 | Soar |
| 2010/0201513 A1 | 8/2010 | Vorenkamp et al. |
| 2011/0156640 A1* | 6/2011 | Moshfeghi .............. H02J 50/12 320/108 |
| 2016/0006291 A1 | 1/2016 | Li et al. |

* cited by examiner

MAGNETO-INDUCTIVE CHARGING AND COMMUNICATION IN ELECTRONIC DEVICES

CROSS-REFERENCE TO RELATED APPLICATIONS

This application is a continuation of U.S. patent application Ser. No. 17/030,877, filed on Sep. 24, 2020, "entitled "Magneto-Inductive Charging and Communication in Electronic Devices," which is a division of U.S. patent application Ser. No. 15/454,847, filed on Mar. 9, 2017, entitled "Magneto-Inductive Charging and Communication in Electronic Devices," now U.S. Pat. No. 10,965,142, which claims the benefit of U.S. Provisional Application No. 62/399,231, entitled "Magneto-Inductive Charging and Communication in Electronic Devices" filed on Sep. 23, 2016, each of which is incorporated by reference herein in its entirety for all purposes.

BACKGROUND

The present disclosure relates generally to wireless electronic devices, and more particularly, to magneto-inductive charging and communication in wireless electronic devices.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Transmitters and receivers, or when coupled together as part of a single unit, transceivers, are commonly included in various electronic devices, and particularly, mobile electronic devices such as, for example, phones (e.g., mobile and cellular phones, cordless phones, personal assistance devices), computers (e.g., laptops, tablet computers), internet connectivity routers (e.g., Wi-Fi routers or modems), radios, televisions, wearable electronic devices (e.g., smartwatches, heartrate monitors, exercise wristbands) or any of various other stationary or handheld devices. Certain types of transceivers, known as wireless transceivers, may be used to generate and receive wireless signals to be transmitted and/or received by way of an antenna coupled to the transceiver. Specifically, the wireless transceiver is generally used to allow the mobile electronic devices to wirelessly communicate data over the air via a network channel (e.g., cellular network or internet network channels) to and from one or more external mobile electronic devices or other wireless electronic devices.

However, as it may be appreciated, within certain environments (e.g., underwater environments, underground environments, high-altitude environments, rural areas, and so forth) wireless electronic devices may not be able to connect to, for example, cellular networks and/or internet networks. Thus, the wireless electronic devices may not be able to communicate in such environments. Accordingly, it may be useful to provide techniques useful in allowing wireless electronic devices to communicate in the absence of cellular and/or internet connectivity.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Various embodiments of the present disclosure may be useful in performing magneto-inductive charging and communication in the absence of a cellular and/or internet network connection. By way of example, an electronic device includes inductive charging and communication circuitry configured to receive a signal configured to induce a charging function based at least in part on an inductive coil coupled to inductive charging and communication circuitry. Inducing the charging function includes charging an energy storage component of the electronic device. The inductive charging and communication circuitry is also configured receive an indication to switch from the charging function to a communication function. The communication function is based at least in part on the inductive coil. The inductive charging and communication circuitry is further configured establish a communication link between the electronic device using the inductive coil to transmit and receive communication signals.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
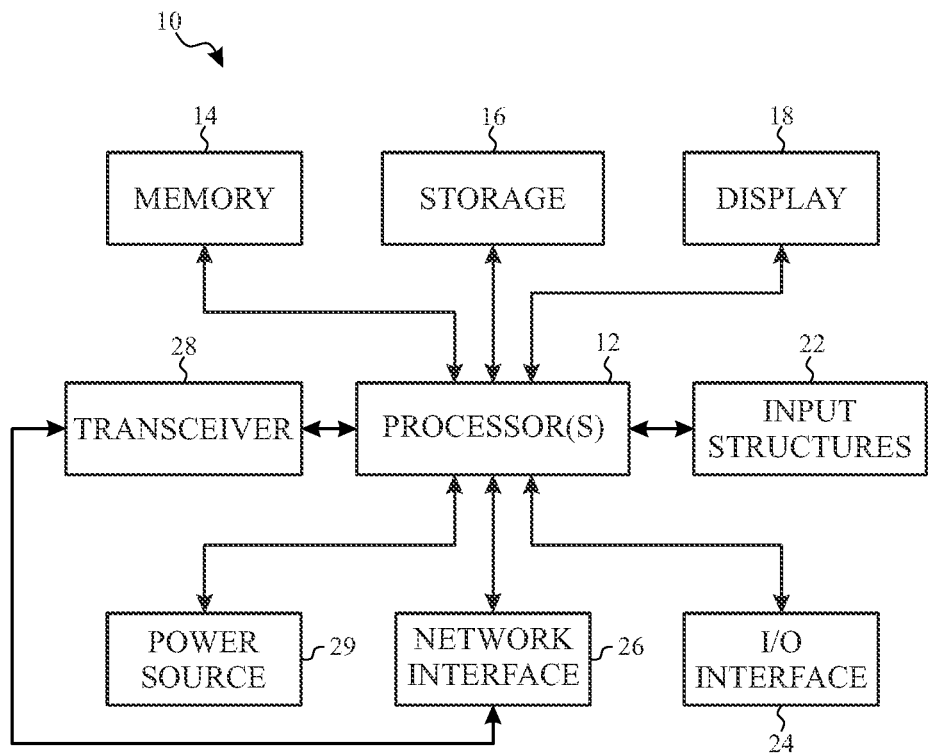
FIG. 1 is a schematic block diagram of an electronic device including a transceiver, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Embodiments of the present disclosure generally relate to a transceiver of an electronic device useful in performing magneto-inductive charging and communication in the absence of a cellular and/or internet network connection. In certain embodiments, the electronic device may include inductive charging and communication circuitry. The inductive charging and communication circuitry may include an inductive charging coil, communication circuitry, charging circuitry, and switching circuitry.

In certain embodiments, the charging circuitry and the communication circuitry may each be coupled to the inductive charging coil via the switching circuitry. The communication circuitry may be used to generate an electromagnetic signal (e.g., magneto-inductive signal) to establish a peer-to-peer (P2P) communication link with, for example, another electronic device and/or a base station or other antenna base. For example, the communication circuitry may be used to allow the electronic device to communicate one or more short messaging service (SMS) messages or multimedia messaging service (MMS) messages via the P2P communication link (e.g., via magneto-inductive signaling) in the absence of a cellular network, an internet network, or any of various other traditional communication networks. In this way, the inductive charging and communication circuitry may allow the electronic device to establish P2P communication links with other electronic devices or antenna bases from remote locations (e.g., underwater, underground, inside of caves or tunnels, at extremely high altitudes, at sea, in "airplane mode", from remote rural land locations, and/or any location in which a cellular or internet network is unavailable).

Indeed, although examples of the present embodiments may be discussed primarily with respect to utilizing the electronic device within underwater or underground environments, it should be appreciated that the techniques described herein may also be useful in any of various other applications such as, for example, medical applications (e.g., noninvasive sensing, heart monitoring), security related applications (e.g., surveillance, motion detection), manufacturing and distribution applications (e.g., products manufacturing and products tracking systems), oil and gas exploration related applications (e.g., downhole and subsea environments), energy extraction applications (e.g., coal mines, tunnels, fracking wells, and so forth), aerospace applications (e.g., "airplane mode"), military applications (e.g., Navy SEAL operations), search and rescue operations, and the like.

With the foregoing in mind, a general description of suitable electronic devices that may be useful in performing magneto-inductive charging and communication in the absence of a cellular and/or internet network connection will be provided below. Turning first to FIG. 1, an electronic device 10 according to an embodiment of the present disclosure may include, among other things, one or more processor(s) 12, memory 14, nonvolatile storage 16, a display 18, input structures 22, an input/output (I/O) interface 24, network interfaces 26, a transceiver 28, and a power source 29. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in electronic device 10.

Figure 2:
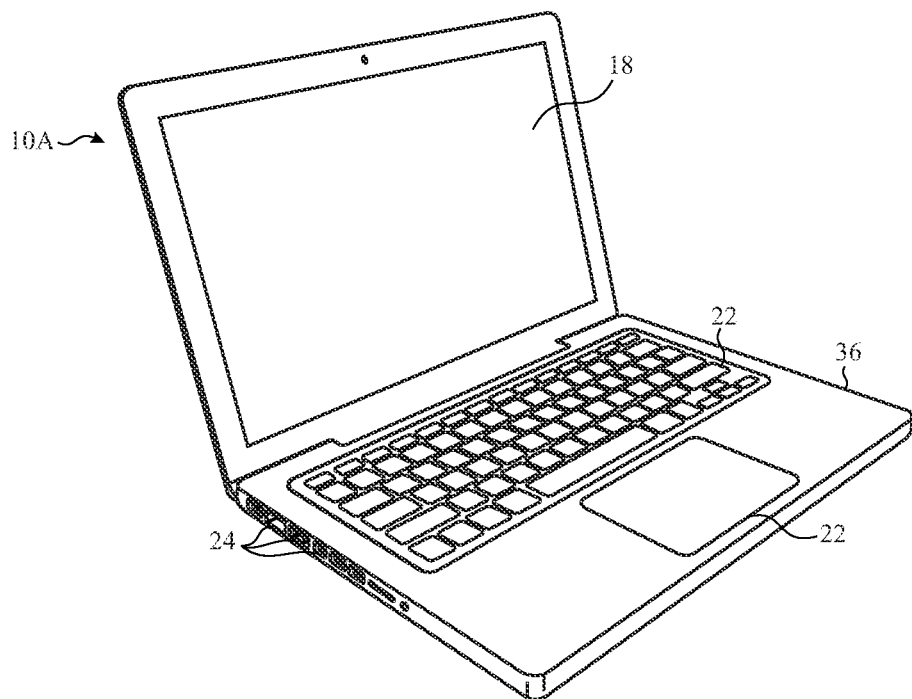
FIG. 2 is a perspective view of a notebook computer representing an embodiment of the electronic device of FIG. 1.
Figure 3:
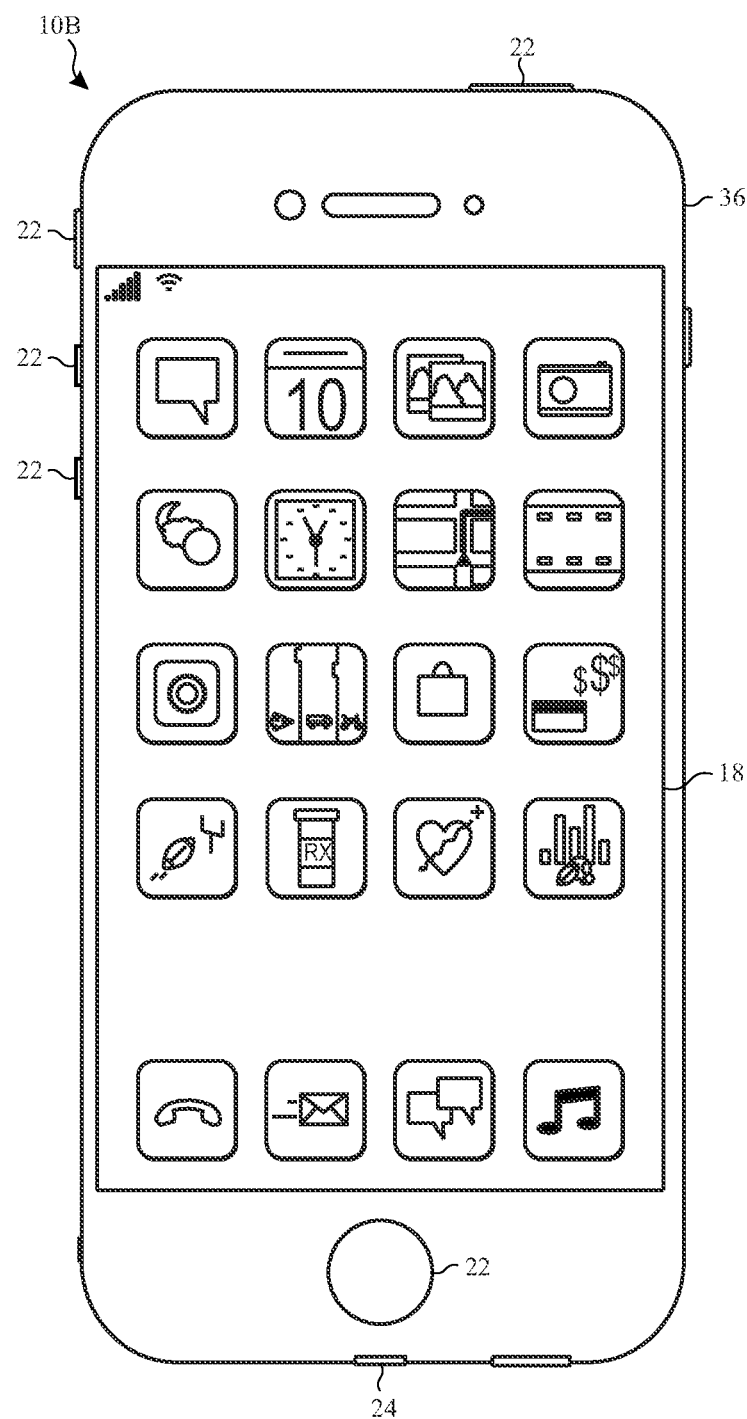
FIG. 3 is a front view of a hand-held device representing another embodiment of the electronic device of FIG. 1.
Figure 4:
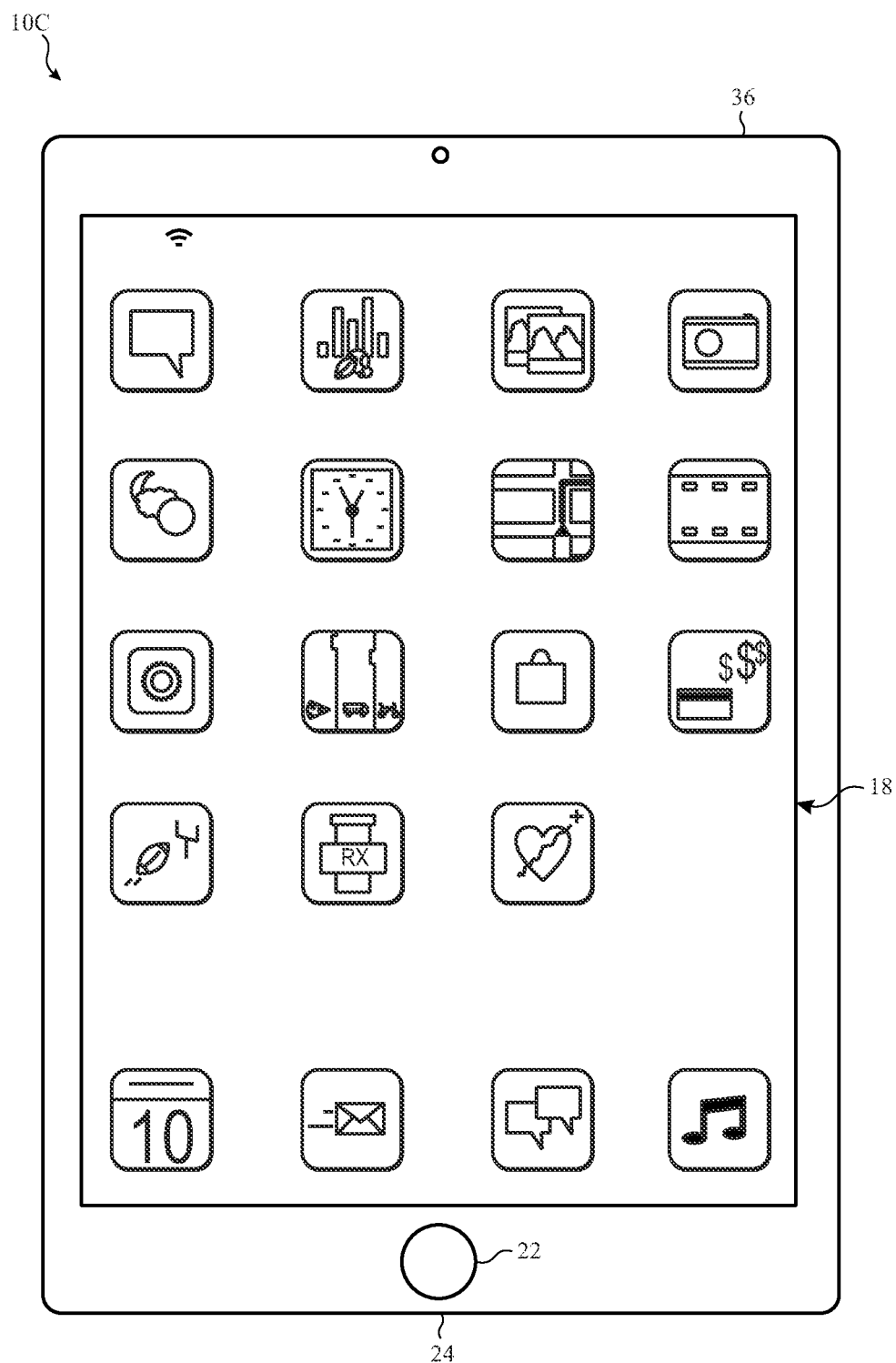
FIG. 4 is a front view of another hand-held device representing another embodiment of the electronic device of FIG. 1.
Figure 5:
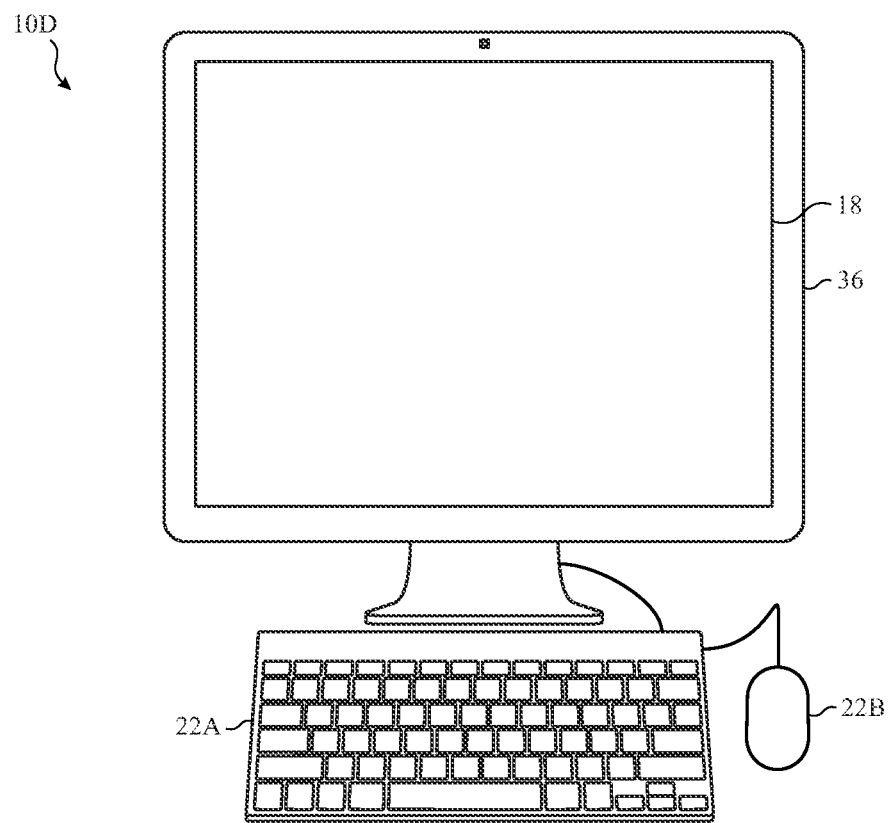
FIG. 5 is a front view of a desktop computer representing another embodiment of the electronic device of FIG. 1.
Figure 6:
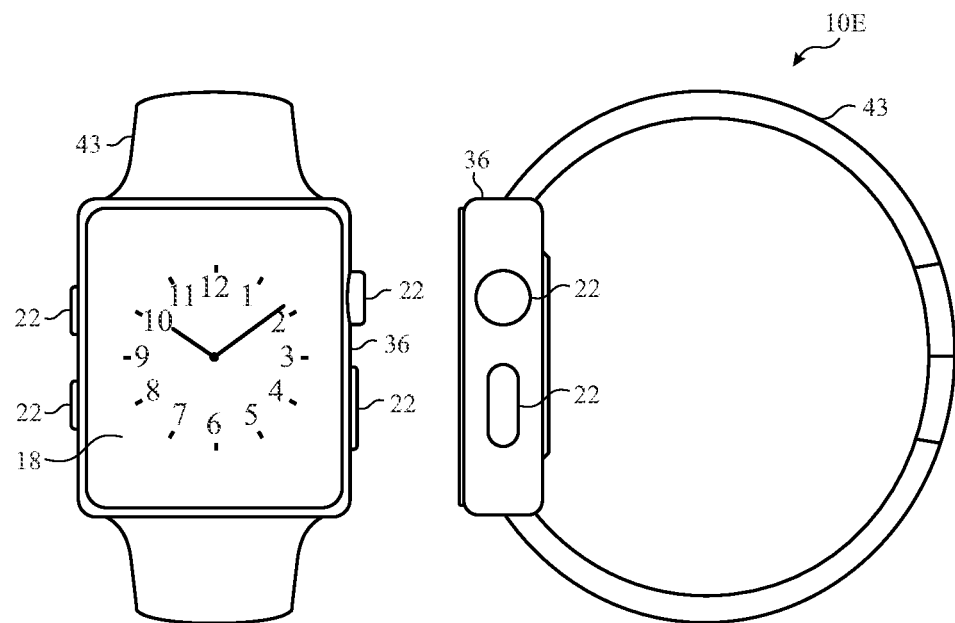
FIG. 6 is a front view and side view of a wearable electronic device representing another embodiment of the electronic device of FIG. 1.

By way of example, the electronic device 10 may represent a block diagram of the notebook computer depicted in FIG. 2, the handheld device depicted in FIG. 3, the handheld device depicted in FIG. 4, the desktop computer depicted in FIG. 5, the wearable electronic device depicted in FIG. 6, or similar devices. It should be noted that the processor(s) 12 and/or other data processing circuitry may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor(s) 12 and/or other data processing circuitry may be operably coupled with the memory 14 and the nonvolatile storage 16 to perform various algorithms. Such programs or instructions executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. Also, programs (e.g., an operating system) encoded on such a computer program product may also include instructions that may be executed by the processor(s) 12 to enable the electronic device 10 to provide various functionalities.

In certain embodiments, the display 18 may be a liquid crystal display (LCD), which may allow users to view images generated on the electronic device 10. In some embodiments, the display 18 may include a touch screen, which may allow users to interact with a user interface of the electronic device 10. Furthermore, it should be appreciated that, in some embodiments, the display 18 may include one or more organic light emitting diode (OLED) displays, or some combination of LCD panels and OLED panels.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interfaces 26. The network interfaces 26 may include, for example, interfaces for a personal area network (PAN), such as a Bluetooth network, for a local area network (LAN) or wireless local area network (WLAN), such as an 802.11x Wi-Fi network, and/or for a wide area network (WAN), such as a $3^{rd}$ generation (3G) cellular network, $4^{th}$ generation (4G) cellular network, long term evolution (LTE) cellular network, or long term evolution license assisted access (LTE-LAA) cellular network. The network interface 26 may also include interfaces for, for example, broadband fixed wireless access networks (WiMAX), mobile broadband Wireless networks (mobile WiMAX), asynchronous digital subscriber lines (e.g., ADSL, VDSL), digital video broadcasting-terrestrial (DVB-T) and its extension DVB Handheld (DVB-H), ultra-Wideband (UWB), alternating current (AC) power lines, and so forth.

In certain embodiments, to allow the electronic device 10 to communicate over the aforementioned wireless networks (e.g., Wi-Fi, WiMAX, mobile WiMAX, 4G, LTE, and so forth), the electronic device 10 may include a transceiver 28. The transceiver 28 may include any circuitry the may be useful in both wirelessly receiving and wirelessly transmitting signals (e.g., data signals). Indeed, in some embodiments, as will be further appreciated, the transceiver 28 may include a transmitter and a receiver combined into a single unit, or, in other embodiments, the transceiver 28 may include a transmitter separate from the receiver.

For example, the transceiver 28 may transmit and receive signals (e.g., data symbols) to support data communication in wireless applications such as, for example, PAN networks (e.g., Bluetooth), WLAN networks (e.g., 802.11x Wi-Fi), WAN networks (e.g., 3G, 4G, and LTE and LTE-LAA cellular networks), WiMAX networks, mobile WiMAX networks, ADSL and VDSL networks, DVB-T and DVB-H networks, UWB networks, and so forth. As further illustrated, the electronic device 10 may include a power source 29. The power source 29 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may include computers that are generally portable (such as laptop, notebook, and tablet computers) as well as computers that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. of Cupertino, California. By way of example, the electronic device 10, taking the form of a notebook computer 10A, is illustrated in FIG. 2 in accordance with one embodiment of the present disclosure. The depicted computer 10A may include a housing or enclosure 36, a display 18, input structures 22, and ports of an I/O interface 24. In one embodiment, the input structures 22 (such as a keyboard and/or touchpad) may be used to interact with the computer 10A, such as to start, control, or operate a GUI or applications running on computer 10A. For example, a keyboard and/or touchpad may allow a user to navigate a user interface or application interface displayed on display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPod® or iPhone® available from Apple Inc. The handheld device 10B may include an enclosure 36 to protect interior components from physical damage and to shield them from electromagnetic interference. The enclosure 36 may surround the display 18. The I/O interfaces 24 may open through the enclosure 36 and may include, for example, an I/O port for a hard wired connection for charging and/or content manipulation using a standard connector and protocol, such as the Lightning connector provided by Apple Inc., a universal service bus (USB), or other similar connector and protocol.

User input structures 22, in combination with the display 18, may allow a user to control the handheld device 10B. For example, the input structures 22 may activate or deactivate the handheld device 10B, navigate user interface to a home screen, a user-configurable application screen, and/or activate a voice-recognition feature of the handheld device 10B. Other input structures 22 may provide volume control, or may toggle between vibrate and ring modes. The input structures 22 may also include a microphone may obtain a user's voice for various voice-related features, and a speaker may enable audio playback and/or certain phone capabilities. The input structures 22 may also include a headphone input may provide a connection to external speakers and/or headphones.

FIG. 4 depicts a front view of another handheld device 10C, which represents another embodiment of the electronic device 10. The handheld device 10C may represent, for example, a tablet computer, or one of various portable computing devices. By way of example, the handheld device 10C may be a tablet-sized embodiment of the electronic device 10, which may be, for example, a model of an iPad® available from Apple Inc.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a MacBook® available from Apple Inc., or other similar device. It should be noted that the computer 10D may also represent a personal computer (PC) by another manufacturer. A similar enclosure 36 may be provided to protect and enclose internal components of the computer 10D such as the display 18. In certain embodiments, a user of the computer 10D may interact with the computer 10D using various peripheral input devices, such as the keyboard 22A or mouse 22B (e.g., input structures 22), which may connect to the computer 10D.

Similarly, FIG. 6 depicts a wearable electronic device 10E representing another embodiment of the electronic device 10 of FIG. 1 that may be configured to operate using the techniques described herein. By way of example, the wearable electronic device 10E, which may include a wristband 43, may be an Apple Watch® by Apple Inc. However, in other embodiments, the wearable electronic device 10E may include any wearable electronic device such as, for example, a wearable exercise monitoring device (e.g., pedometer, accelerometer, heart rate monitor), or other device by another manufacturer. The display 18 of the wearable electronic device 10E may include a touch screen display 18 (e.g., LCD, OLED display, active-matrix organic light emitting diode (AMOLED) display, and so forth), as well as input structures 22, which may allow users to interact with a user interface of the wearable electronic device 10E.

In certain embodiments, as will be discussed henceforth, each embodiment (e.g., notebook computer 10A, handheld device 10B, handheld device 10C, computer 10D, and wearable electronic device 10E) of the electronic device 10 may include inductive charging and communication circuitry. For example, in certain embodiments, inductive charging and communication circuitry may be used to not only allow the electronic device 10 to be wirelessly charged (e.g., inductive power transfer [IPT]), but may also allow the electronic device 10 to wirelessly communicate offline (e.g., wirelessly communicate via magneto-inductive signaling as opposed to utilizing a cellular, internet, or any of various other traditional communication networks).

In this way, the inductive charging and communication circuitry may allow the electronic device 10 to establish one or more peer-to-peer (P2P) communication links with another electronic device or an antenna base from remote locations (e.g., underwater, underground, inside of caves or tunnels, at extremely high altitudes, at sea, in "airplane mode", from remote rural land locations, and/or any location in which a cellular or internet network is unavailable). Furthermore, P2P communication is reduction of redundant noise. For example, certain cellular base stations or wireless routers may broadcast signals from one user to the entire service area in order to reach the intended user on the other end. This may be a source of noise to other receivers (users) in that service area. However, the present embodiments may include a magneto-inductive communication link and a reduced broadcast region (e.g., thus, limited the noise to other users).

Figure 7:
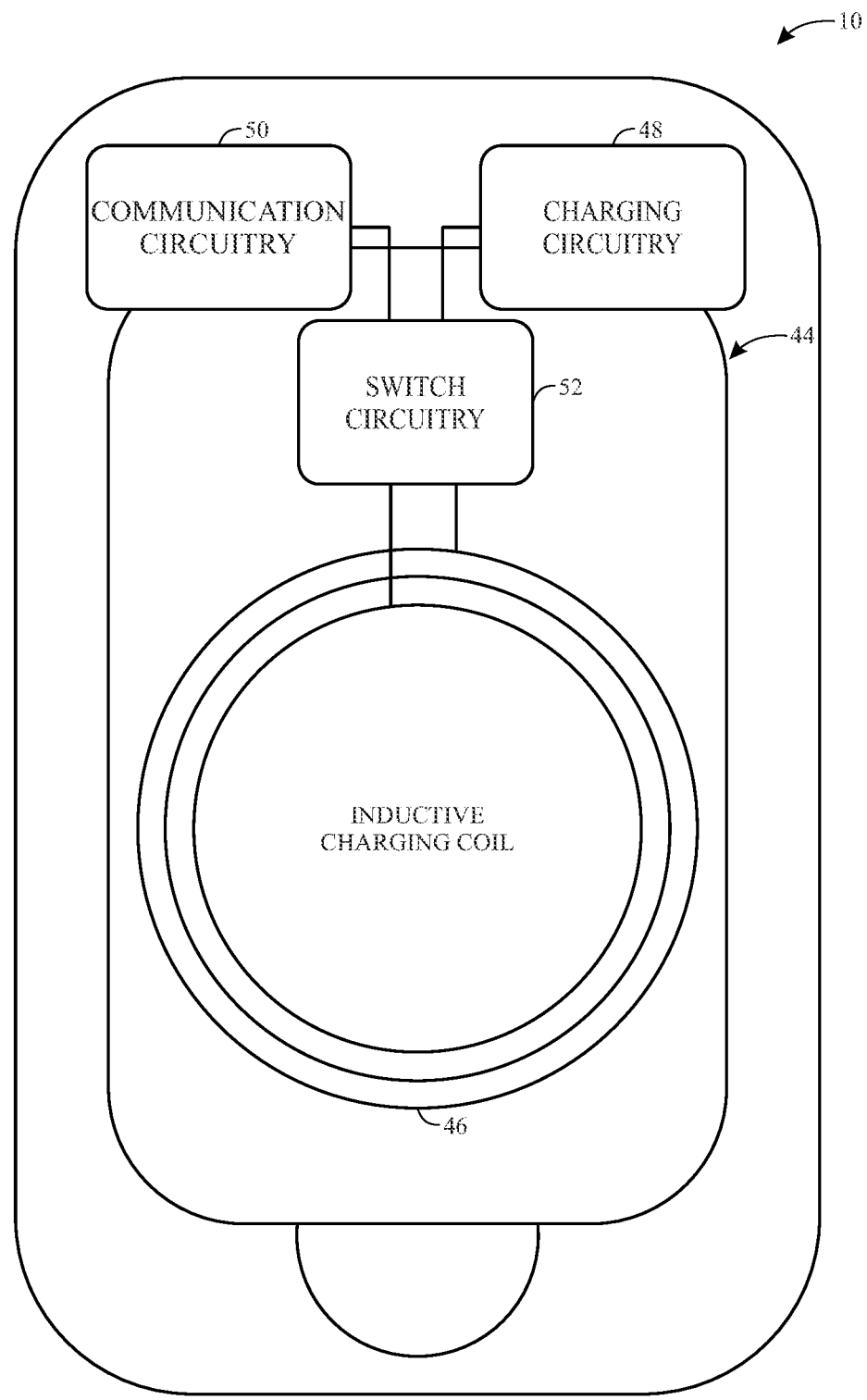
FIG. 7 is a schematic diagram of inductive charging and communication circuitry included within the electronic device of FIG. 1, in accordance with an embodiment.

FIG. 7 illustrates an example of inductive charging and communication circuitry 44 that may be included within the electronic device 10. For example, as depicted, the inductive charging and communication circuitry 44 may include an inductive charging coil 46, charging circuitry 48, communication circuitry 50, and switching circuitry 52. In certain embodiments, the inductive charging coil 46 may include any metal coil useful in receiving an alternating current (AC) and inducing a time varying magnetic field and/or receiving a time varying magnetic field in response thereto. Similarly, the charging circuitry 48, which may be coupled to the inductive charging coil 46 via the switching circuitry 52, may include any circuitry that may be useful in converting the current flowing through the inductive charging coil 46 into a direct current (DC). The charging circuitry 48 may then use the DC current to charge, for example, the battery or other energy storage device that may be included within the electronic device 10. Indeed, the electronic device 10 may allow a user to enable magneto-inductive communication in lieu of any of the aforementioned more traditional wireless communication methods.

In certain embodiments, as further depicted by FIG. 7, the inductive charging and communication circuitry 44 may include communication circuitry 50, which may be also coupled to the inductive charging coil 46 via the switching circuitry 52. The communication circuitry 50 may be used to generate an electromagnetic signal (e.g., magneto-inductive signal) to establish a P2P communication link with, for example, another electronic device and/or a base station or other antenna base. For example, as will be further appreciated, the communication circuitry 50 may be used to allow the electronic device 10 to communicate one or more short messaging service (SMS) messages or multimedia messaging service (MMS) messages via the P2P communication link offline (e.g., via magneto-inductive signaling as opposed to utilizing a cellular network, Internet network, or any of various other traditional communication networks). It should be appreciated that the communication circuitry 50 may allow the electronic device 10 to receive and transmit wireless signals. For example, in one embodiment, the communication circuitry 50 may be used to allow the electronic device 10 to communicate signals in a 125 kilohertz (kHz) frequency band, or in a frequency band between 9 kHz and 9 gigahertz (GHz).

In some embodiments, it should be appreciated that switching circuitry 52 may include any of various electronic switching devices (e.g., electronic hardware switch) that may allow the inductive charging and communication circuitry 44 alternatively switch between performing magneto-inductive charging and magneto-inductive communication (e.g., magneto-inductive signaling). In one or more embodiments, the switching circuitry 52 may be controlled by the processor(s) 12, and may, for example, alternatively switch between performing magneto-inductive charging and magneto-inductive communication (e.g., magneto-inductive signaling) based on a user input.

Figure 8:
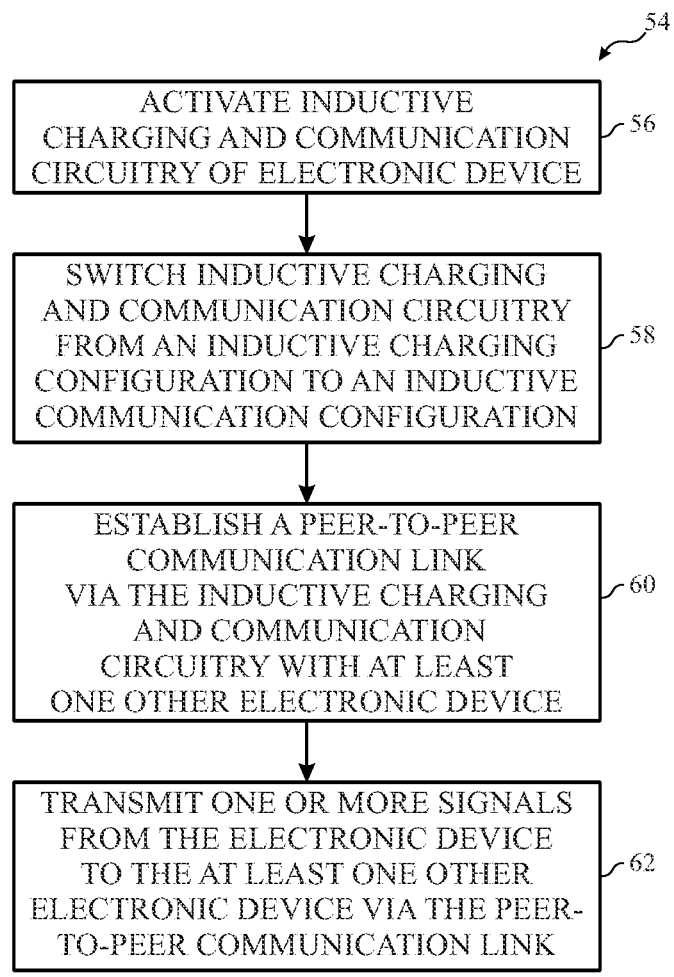
FIG. 8 is a flow diagram illustrating an embodiment of a process useful in performing magneto-inductive charging and communication in the absence of a cellular and/or internet network connection, in accordance with an embodiment.

Turning now to FIG. 8, a flow diagram is presented, illustrating an embodiment of a process 54 useful in performing magneto-inductive charging and communication in the absence of a cellular and/or internet network connection utilizing, for example, the inductive charging and communication circuitry 44 depicted in FIG. 7. The process 54 may include code or instructions stored in a non-transitory machine-readable medium (e.g., the memory 14) and executed, for example, by the one or more processor(s) 12 of the electronic device 10. The process 54 may begin with the one or more processor(s) 12 activating the inductive charging and communication circuitry 44 (block 56). The process 54 may continue with the one or more processor(s) 12 switching inductive charging and communication circuitry 44 from an inductive charging configuration to an inductive communication configuration (block 58).

The process 54 may continue with the one or more processor(s) 12 establishing a peer-to-peer (P2P) communication link via the inductive charging and communication circuitry 44 with at least one other electronic device or an antenna base (block 60). The process 54 may then conclude with the one or more processor(s) 12 causing the inductive charging and communication circuitry 44 to transmit one or more signals from, for example, the electronic device 10 to at least one other electronic device or an antenna base via the P2P communication link (block 62). In this way, the inductive charging and communication circuitry 44 may allow the electronic device 10 to establish one or more peer-to-peer (P2P) communication links with another electronic device or an antenna base from remote locations (e.g., underwater, underground, inside of caves or tunnels, at extremely high altitudes, at sea, in "airplane mode", from remote rural land locations, and/or any location in which a cellular or internet is unavailable). In view of the foregoing, FIGS. 9-12 depict a number of applications (e.g., example use cases) in which the presently described techniques may be utilized.

Example Use Case 1

Figure 9:
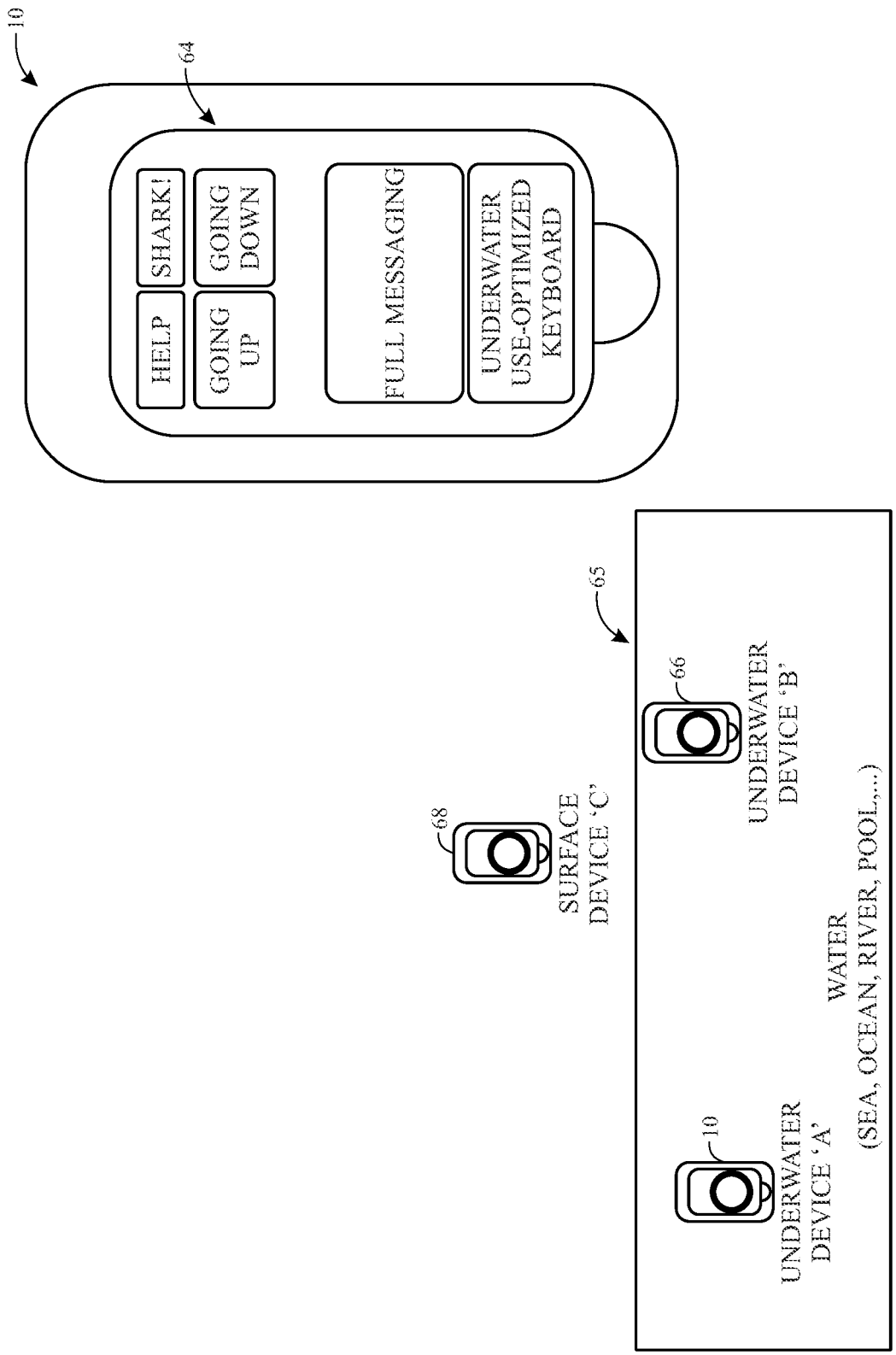
FIG. 9 is an illustration of an example use of the electronic device of FIG. 7, in accordance with an embodiment.

As an example, in certain embodiments, as depicted in FIG. 9, the electronic device 10 may be used to communicate in underwater environments. For example, as illustrated, the electronic device 10 (e.g., "underwater device A") may be located within an underwater environment 65 (e.g., sea, ocean, river, pool, and so forth). In this example, another electronic device 66 (e.g., "underwater device B") may also be located within the underwater environment 65, while a third electronic device 68 (e.g., "surface device C") may be located above water. In certain embodiments, utilizing the inductive charging and communication circuitry 44, the electronic device 10 may wirelessly communicate (e.g., low-frequency magneto-inductive signaling) one or more messages (e.g., SMS, MMS) to the underwater electronic device 66. The underwater electronic device 66 may then communicate the one or more messages to the above-water electronic device 68.

As it may be appreciated, water may have a very negligible impact on the magnetic fields (e.g., water permeability~=1) generated by the inductive charging and communication circuitry 44 (and in general), and thus the inductive charging and communication circuitry 44 may allow the electronic device 10 (e.g., "underwater device A") to transmit and/or receive magneto-inductive signals with negligible losses and/or interferences. In one embodiment, the electronic device 10 (e.g., "underwater device A") may include a waterproof electronic device or may encapsulated by water-insulated casing.

In certain embodiments, as further depicted by FIG. 9, the electronic device 10 may launch a software application 64 (e.g., app) in the inductive communication configuration. For example, in some embodiments, the software application 64 may include an application conducive to underwater usage, and may include, for example, a look-up table (LUT) of predetermined key messages and special keyboard features (e.g., enlarged buttons, character rolls, and so forth).

For example, in certain embodiments, the predetermined messages may include, but may not be limited to, "Help!", "Here!", "Going up!", "Going down!", "Shark!", or any of various other predetermined SMS messages that may indicate pertinent information in the most efficient manner. In some embodiments, the predetermined SMS messages may be user-customizable and may include specific user identification (ID) signatures. Thus, FIG. 9 illustrates that the inductive and charging and communication circuitry 44 may allow the electronic device 10 to wirelessly communicate in the following scenarios: underwater electronic device-to-underwater electronic device, surface electronic device-to-underwater electronic device, and/or surface electronic device-to-surface electronic device.

Example Use Case 2

Figure 10:
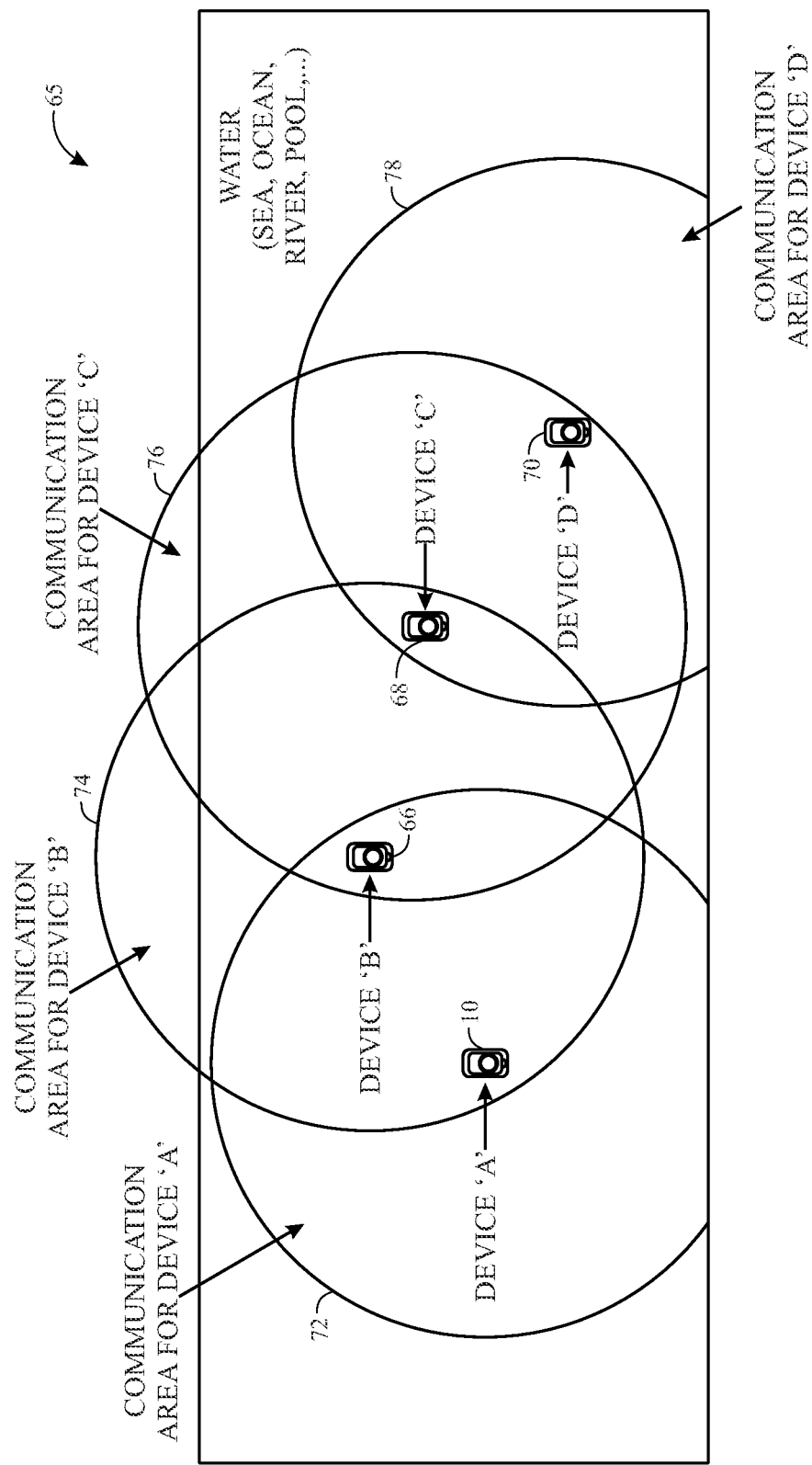
FIG. 10 is an illustration of another example use of the electronic device of FIG. 7, in accordance with an embodiment.

In certain embodiments, as depicted in FIG. 10, the electronic device 10 may be one of a number electronic devices that may be located within the underwater environment 65 (e.g., sea, ocean, river, pool). As illustrated by FIG. 10, for a number of electronic devices 10 (e.g., "underwater device A"), 66 (e.g., "underwater device B"), 68 (e.g., "underwater device C"), and 70 (e.g., "underwater device D") that may be distributed across large underwater area, the electronic devices 10, 66, 68, and 70 may form a message re-broadcast network that may be utilized to increase communication range.

For example, as illustrated by FIG. 10, each of the electronic devices 10, 66, 68, and 70 may form a respective a communication coverage area 72, 74, 76, and 78. In such an embodiment, messages may be successively rebroadcast via a communication path of, for example, electronic device 10 to electronic device 66 to electronic device 68 to electronic device 70 (e.g., quasi-mesh network). In this way, the inductive charging and communication circuitry 44 may allow the electronic device 10, for example, to communicate messages to, and receive messages from, for example, the electronic device 70, even though the electronic device 10 and the electronic device 70 may be out of range with one another.

Example Use Case 3

Figure 11:
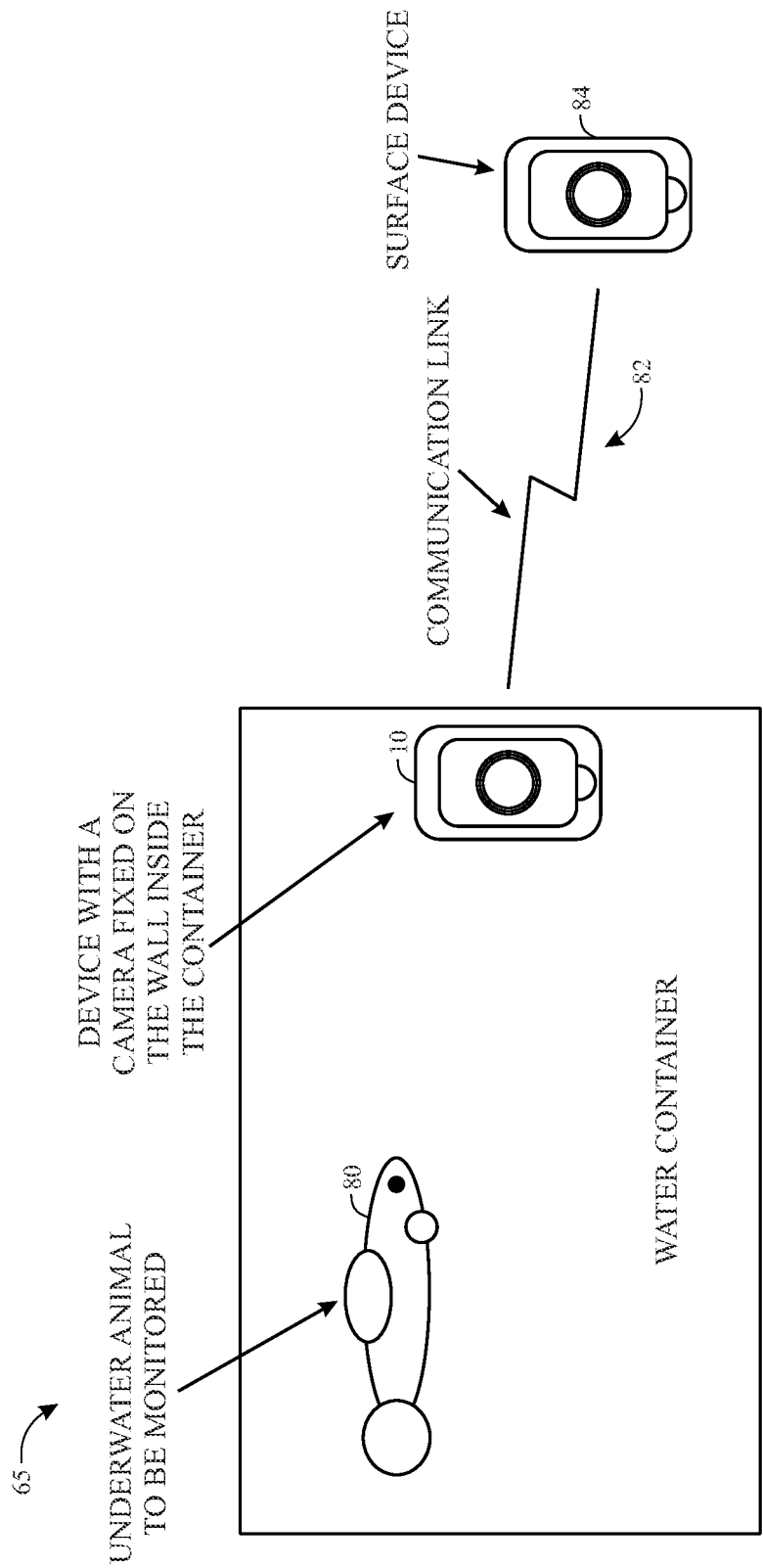
FIG. 11 is an illustration of another example use of the electronic device of FIG. 7, in accordance with an embodiment.

In certain embodiments, as depicted in FIG. 11, the inductive charging and communication circuitry 44 may allow the electronic device 10, which may be positioned within the underwater environment 65 (e.g., sea, ocean, river, pool, aquarium, fish tank, animal cage, liquid storage tank, a container including a gaseous or liquid medium, a container including a low or high pressure gaseous medium, vacuum) to capture and store still images or video images of the underwater environment 65 and, for example, sea animals 80 within the underwater environment 65. In some embodiments, the electronic device 10 may commence capturing still images and/or live video images based on, for example, a timer or motion detection. The electronic device 10 may then transmit the still images and/or live video images to a surface electronic device 10 via a P2P communication link 82 (e.g., via magneto-inductive signaling).

Furthermore, if the electronic device 10 begins to run low on power while submerged, the inductive charging and communication circuitry 44 may recharge the electronic device 10 without the electronic device 10 having to be removed from the underwater environment 65. In some embodiments, a charge-initiating signal (e.g., based on the battery charge level of the electronic device 10) may be detected by electronic device 10, and the switching circuitry 52 may cause the inductive charging and communication circuitry 44 to switch from performing the communication function to performing the charging function without the electronic device 10 having to be removed from the underwater environment 65. Once the charging function is completed, the switching circuitry 52 may cause the inductive charging and communication circuitry 44 to switch from performing the charging function to back to performing the communication function (e.g., without the electronic device 10 having to be removed from the underwater environment 65).

Example Use Case 4

Figure 12:
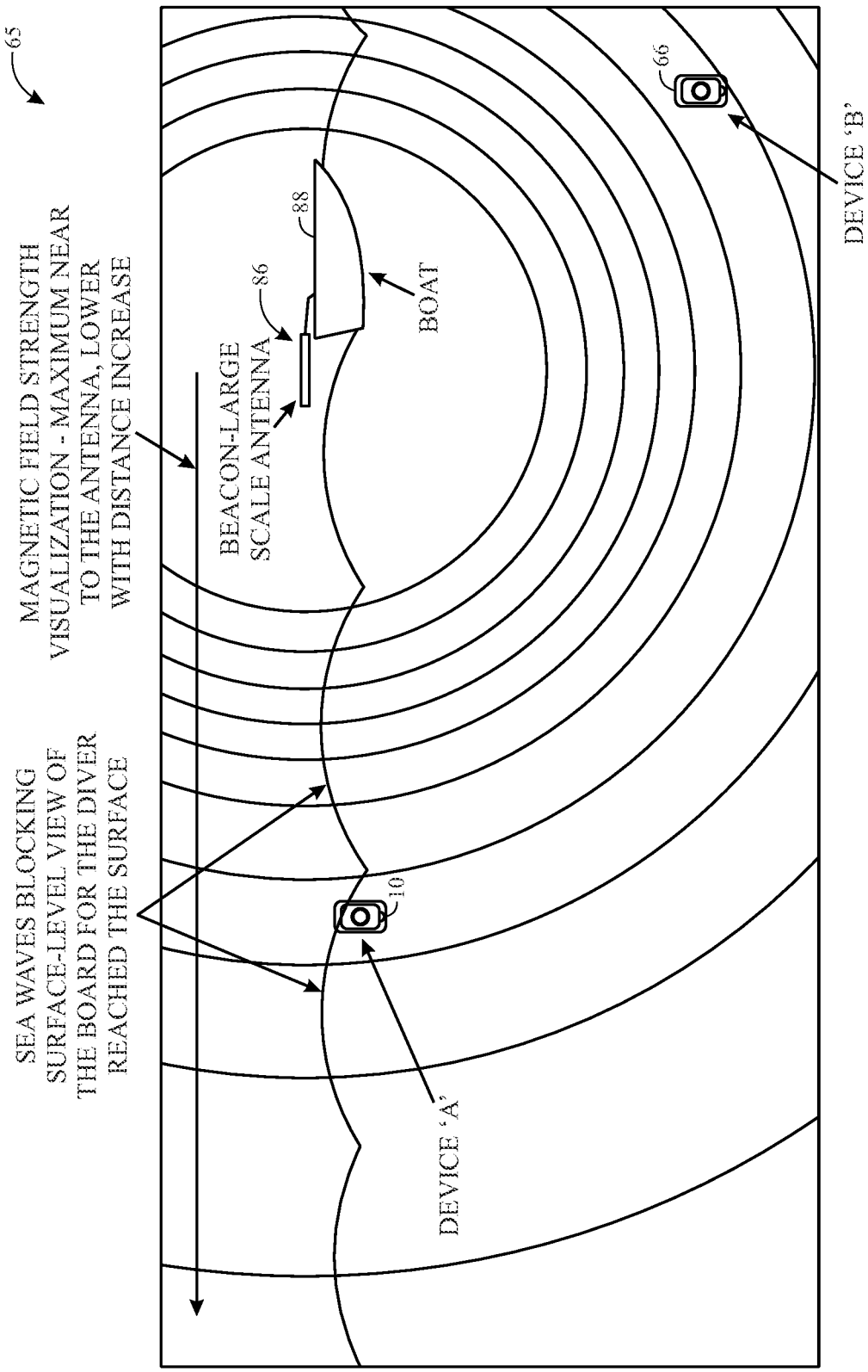
FIG. 12 is an illustration of an example use of the electronic device of FIG. 7, in accordance with an embodiment.

FIG. 12 illustrates another example embodiment of the presently disclosed techniques, in which a large-scale high-power magnetic field source coil antenna 86 may be placed on a sea vessel 88 (e.g., boat or ship) and operate as a communication beacon on the surface for, for example, divers that may be within the underwater environment 65. For example, as further depicted, in one embodiment, the coil antenna 86 may extend from the sea vessel 88 into the open air. In another embodiment, the coil antenna 86 may be submerged within underwater environment 65 directly underneath the sea vessel 88.

In the present embodiment, the inductive charging and communication circuitry 44 of the electronic device 10 (e.g., "underwater device A") may operate only in receive mode to indicate, for example, a received signal strength indication (RSSI) of the communication beacon signal generated by the coil antenna 86. For example, in this way, a user of the electronic device 10 may rotate or move underwater and/or on the surface of the water while observing RSSI increasing or decreasing, which would thus indicate the direction in which the sea vessel 88 is moving.

In certain embodiments, the coil antenna 86 on the sea vessel 88 may be powered from a high-power source on the sea vessel 88, and may thus be useful in achieving large underwater communication coverage such that communication beacon signal may be detected by the electronic device 10 and the deeply submerged electronic device 66 (e.g., "underwater device B"). In some embodiments, the coil antenna 86 of the sea vessel 88 may be a single-loop, fixed orientation antenna, or, in another embodiment, may include a number of loops positioned in orthogonal orientations and may operate at the same frequency or at different frequencies. In some embodiments, the electronic device 10 may include software that may be useful in correlating the different frequencies and RSSI values to the specific positioning of the coil antenna 86 to increase direction detection accuracy.

Example Use Case 5

Another example embodiment of the presently disclosed techniques may include the electronic device 10 operating as a communication beacon in, for example, search and rescue operations. For example, in one embodiment, the electronic 10 may include a search and rescue related software application (e.g., app) that may allow a user to send an SMS message as to her whereabouts and safety conditions. The electronic device 10 may also be able to provide location data (e.g., GPS), voice messages, SMS and MMS messages, and so forth from any location in which a cellular or internet is unavailable. In this way, the present embodiments, may facilitate search and rescue operations.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method, comprising:
    establishing a first inductive communication link between a first electronic device and a second electronic device using inductive communication circuitry, the first electronic device and the second electronic device being below water;
    establishing a second inductive communication link between the first electronic device and a third electronic device using the inductive communication circuitry;
    receiving a message at the first electronic device from the second electronic device via the first inductive communication link; and
    rebroadcasting the message from the first electronic device to the third electronic device via the second inductive communication link.

2. The method of claim 1, wherein establishing the first inductive communication link between the first electronic device and the second electronic device and establishing the second inductive communication link between the first electronic device and the second electronic device each comprises establishing respective magneto-inductive communication links.

3. The method of claim 1, wherein receiving the message from the second electronic device at the first electronic device via the first inductive communication link comprises receiving the message via one or more short messaging service (SMS) messages from the second electronic device to the first electronic device.

4. The method of claim 1, wherein receiving the message from the second electronic device at the first electronic device via the first inductive communication link comprises receiving the message via one or more multimedia messaging service (MMS) messages from the second electronic device to the first electronic device.

5. The method of claim 1, wherein the first electronic device comprises a cellular phone or a tablet computer.

6. The method of claim 1, wherein the first electronic device comprises a wearable electronic device.

7. The method of claim 1, further comprising transmitting a second message to the third electronic device to be rebroadcast to a fourth electronic device.

8. The method of claim 7, wherein the third electronic device and the fourth electronic device are above the water, and the rebroadcast of the second message via the third electronic device is performed via wireless signals via a network interface of the third electronic device.

9. The method of claim 8, wherein the wireless signals are broadcast as part of messaging in a wide area network (WAN), a wireless local area network (WLAN), a personal area network (PAN), or a cellular network.

10. The method of claim 7, wherein the third electronic device and the fourth electronic device are both below the water.

11. A wireless electronic device, comprising:
    an inductive charging coil configured to receive a signal configured to induce a current on the inductive charging coil;
    switching circuitry coupled to the inductive charging coil and configured to cause the wireless electronic device to switch from an inductive charging configuration to an inductive communication configuration;
    inductive charging circuitry coupled to the inductive charging coil via the switching circuitry, the inductive charging circuitry being configured to utilize the current to charge an energy storage component of the wireless electronic device in the inductive charging configuration; and
    inductive communication circuitry coupled to the inductive charging coil via the switching circuitry, the inductive communication circuitry being configured to establish a first inductive communication channel between the wireless electronic device and a second wireless electronic device using the inductive charging coil and to establish a second inductive communication channel between the wireless electronic device and a third wireless electronic device and to receive a message from the second wireless electronic device and to rebroadcast the message to the third wireless electronic device to form an underwater network including the wireless electronic device, the second wireless electronic device, and the third wireless electronic device when each of the wireless electronic device, the second wireless electronic device, and the third wireless electronic device are underwater.

12. The wireless electronic device of claim 11, wherein the wireless electronic device is configured to capture an image of an underwater environment when the wireless electronic device is within the underwater environment and to transmit a captured image to the second wireless electronic device via the first inductive communication channel or the second inductive communication channel.

13. The wireless electronic device of claim 12, wherein the wireless electronic device is configured to transmit the captured image via Wi-Fi or cellular signals when the wireless electronic device is out of the underwater environment.

14. An electronic device, comprising:
an inductive coil;
inductive communication circuitry coupled to the inductive coil and configured to establish a first inductive link between the electronic device and a second electronic device using the inductive coil and a second inductive link between the electronic device and a third electronic device and to receive a message from the second electronic device and rebroadcast the message to the third electronic device; and
a processor configured to cause rebroadcasting of the message.

15. The electronic device of claim 14, wherein the inductive communication circuitry is configured to cause the electronic device to rebroadcast the message via the second inductive link as a short message service (SMS) message.

16. The electronic device of claim 14, wherein the electronic device is mounted to a boat, the second electronic device on a surface of water on which the boat is floating, and the third electronic device is under the surface of the water.

17. The electronic device of claim 16, wherein the inductive coil of the electronic device is under the surface of the water.

18. The electronic device of claim 14, wherein the electronic device is mounted to a boat, and the second electronic device and the third electronic device are under a surface of water on which the boat is floating.

19. The electronic device of claim 18, wherein the inductive coil of the electronic device is under the surface of the water.

20. The electronic device of claim 14, wherein the electronic device is mounted to a boat and has a stronger broadcast power capability via magneto-inductive communication than broadcast power capabilities of the second electronic device or the third electronic device via magneto-inductive communication.

* * * * *